United States Patent
Smith (10) Patent No.: US 11,295,893 B2
(45) Date of Patent: Apr. 5, 2022

(54) SELF-ALIGNING CAPACITOR ELECTRODE ASSEMBLY HAVING IMPROVED BREAKDOWN VOLTAGE

(71) Applicant: AVX Corporation, Fountain Inn, SC (US)

(72) Inventor: David M. Smith, Sebastian, FL (US)

(73) Assignee: KYOCERA AVX Components Corporation, Fountain Inn, SC (US)

(*) Notice: Subject to any disclaimer, the term of this patent is extended or adjusted under 35 U.S.C. 154(b) by 0 days.

(21) Appl. No.: 16/276,662

(22) Filed: Feb. 15, 2019

(65) Prior Publication Data

US 2019/0259534 A1 Aug. 22, 2019

Related U.S. Application Data

(60) Provisional application No. 62/631,565, filed on Feb. 16, 2018.

(51) Int. Cl.
*H01G 4/005* (2006.01)
*H01G 4/228* (2006.01)
*H01G 4/14* (2006.01)

(52) U.S. Cl.
CPC ........... *H01G 4/005* (2013.01); *H01G 4/14* (2013.01); *H01G 4/228* (2013.01)

(58) Field of Classification Search
CPC ........... H01G 4/30; H01G 4/005; H01G 4/14; H01G 4/228
USPC ............... 361/301.4, 321.2, 303, 304, 306.1
See application file for complete search history.

(56) References Cited

U.S. PATENT DOCUMENTS

| | | |
|---|---|---|
| 3,365,400 A | 1/1968 | Pulvari |
| 3,896,354 A | 7/1975 | Coleman et al. |
| 4,160,987 A | 7/1979 | Dennard et al. |
| 4,978,634 A | 12/1990 | Shen et al. |
| 5,894,647 A | 4/1999 | Lakin |
| 5,929,477 A | 7/1999 | McAllister Burns, Jr. et al. |
| 5,942,958 A | 8/1999 | Lakin |
| 6,577,043 B2 | 6/2003 | Tsukai et al. |
| 6,903,496 B2 | 6/2005 | Takeuchi et al. |
| 7,187,109 B2 | 3/2007 | Tikka et al. |
| 7,439,840 B2 | 10/2008 | Carastro et al. |

(Continued)

FOREIGN PATENT DOCUMENTS

EP 1 829 130 B1 7/2016

OTHER PUBLICATIONS

International Search Report and Written Opinion for PCT/US2019/018165 dated Jun. 5, 2019, 13 pages.

*Primary Examiner* — Arun Ramaswamy
(74) *Attorney, Agent, or Firm* — Dority & Manning, P.A.

(57) ABSTRACT

A self-aligning capacitor electrode assembly having an improved breakdown voltage is disclosed. The electrode assembly comprises a first electrode having a generally planar shape and a length in a first direction. The electrode assembly also comprises a second electrode having a generally planar shape and a length in a second direction. The second electrode overlaps the first electrode such that an overlapping region is formed. The overlapping region has an area that is insensitive to a relative misalignment in the first direction between the first electrode and the second electrode that is less than a first offset distance. A ratio of the length of the first electrode to the first offset distance is less than about 45.

18 Claims, 10 Drawing Sheets

(56) References Cited

U.S. PATENT DOCUMENTS

| | | | |
|---|---|---|---|
| 8,174,634 B2 | 5/2012 | Sirringhaus et al. | |
| 8,179,659 B2 | 5/2012 | Nabeshima | |
| 8,390,984 B2 | 3/2013 | Liu et al. | |
| 8,446,705 B2 | 5/2013 | Ritter et al. | |
| 8,581,240 B2 | 11/2013 | Sirringhaus et al. | |
| 8,659,871 B2 | 2/2014 | Togashi et al. | |
| 2004/0027787 A1* | 2/2004 | Yamauchi | H01G 4/30 361/321.2 |
| 2010/0207710 A1* | 8/2010 | Ziegler | H05K 1/162 333/204 |
| 2011/0018126 A1* | 1/2011 | Kling | H01L 23/645 257/713 |
| 2016/0014903 A1* | 1/2016 | Kato | H05K 1/0298 361/749 |

* cited by examiner

SELF-ALIGNING CAPACITOR ELECTRODE ASSEMBLY HAVING IMPROVED BREAKDOWN VOLTAGE

CROSS REFERENCE TO RELATED APPLICATION

The present application claims filing benefit of U.S. Provisional Patent Application Ser. No. 62/631,565 having a filing date of Feb. 16, 2018, which is incorporated herein by reference in its entirety.

BACKGROUND OF THE INVENTION

Various electronic components, including capacitors, employ generally parallel electrodes. For example, multilayer ceramic capacitors are typically constructed with a plurality of stacked dielectric-electrode layers. Additionally, thin film capacitors, thick film capacitors, and supercapacitors may employ parallel electrodes.

The ability to manufacture a capacitor to a highly precise capacitance specification is desirable. Such capacitors can be used in circuits that are sensitive to small variations in capacitance, including filters, for example.

During manufacturing, electrodes are manufactured and aligned. The precision with which this is accomplished, however, is limited by practical considerations, often resulting in at least partial misalignment of the electrodes. Additionally, a general trend towards miniaturization of electronic components has increased demand for smaller capacitors. Miniaturization further increases the difficulty of reliably producing precise capacitance values.

Additionally, conventional capacitor designs often result in undesirable charge concentrations in a dielectric material, which can lower the breakdown voltage of the capacitor. Breakdown of the dielectric can cause the capacitor to malfunction and/or damage the capacitor. As such, an electrode assembly that is more easily manufactured to a precise capacitance specification and that has an improved breakdown voltage would be desirable.

SUMMARY

In accordance with one embodiment of the present invention, an electrode assembly is disclosed that comprises a first electrode having a generally planar shape and a length in a first direction and a second electrode having a generally planar shape and a length in a second direction. The second electrode overlaps the first electrode such that an overlapping region is formed. The overlapping region has an area that is insensitive to a relative misalignment in the first direction between the first electrode and the second electrode that is less than a first offset distance. A ratio of the length of the first electrode to the first offset distance is less than about 45.

Other features and aspects of the present invention are set forth in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the appended figure in which.

DETAILED DESCRIPTION OF REPRESENTATIVE EMBODIMENTS

It is to be understood by one skilled in the art that the present disclosure is a description of exemplary embodiments only, and is not intended as limiting the broader aspects of the present subject matter, which broader aspects are embodied in the exemplary constructions.

Generally, the present disclosure is directed to a self-aligning capacitor having an improved breakdown voltage. The capacitor may have a variety of different configurations. Examples include multilayer ceramic capacitors, thin film capacitors, thick film capacitors, supercapacitors, and multilayer organic devices. Aspects of the present disclosure are applicable to any electronic device having generally parallel electrodes, however.

For example, multilayer ceramic capacitors may employ dielectric materials including a ceramic, semiconductive, or insulating material, such as, but not limited to barium titanate, calcium titanate, zinc oxide, alumina with low-fire glass, or other suitable ceramic or glass-bonded materials. Alternatively, the dielectric material may be an organic compound such as an epoxy (with or without ceramic mixed in, with or without fiberglass), popular as circuit board materials, or other plastics common as dielectrics. In these cases, the conductor is usually a copper foil which is chemically etched to provide the patterns. In still further embodiments, dielectric material may comprise a material having a relatively high dielectric constant (K), such as one of NPO (COG), X7R, X5R X7S, Z5U, Y5V and strontium titanate. In one example, the dielectric material may have a dielectric constant within a range from between about 2000 and about 4000.

Thin film capacitors may employ a variety of dielectric materials including but not limited to silicon oxynitride, silicon nitride, silicon oxide, barium titanate, strontium titanate, strontium barium titanate, bismuth strontium tantalate, tantalum, niobium, oxides or nitrides or such materials, NPO (COG), X7R, X7S, Z5U, Y5V formulations, lead-based materials such as doped or non-doped PZT dielectrics, and others.

An organic dielectric layer may comprise at least one of the following types of organic materials: polyphenyl ether (PPE) based materials, such as LD621 from Polyclad and N6000 series from Park/Nelco Corporation, liquid crystalline polymer (LCP), such as LCP from Rogers Corporation or W. L. Gore & Associates, Inc., hydrocarbon composites, such as 4000 series from Rogers Corporation, and epoxy-based laminates, such as N4000 series from Park/Nelco Corp. For instance, examples include epoxy based N4000-13, bromine-free material laminated to LCP, organic layers with high K material, unfilled high-K organic layers, Rogers 4350, Rogers 4003 material, and other theremoplastic materials such as polyphenylene sulfide resins, polyethylene terephthalate resins, polybutylene terephthalate resins, polyethylene sulfide resins, polyether ketone resins, polytetraflouroethylene resins and graft resins, or similar low dielectric constant, low-loss organic material.

The dielectric constant may be between approximately 1.5 and 100, in some embodiments from about 2 to about 15, and in some embodiments from about 2 to about 4. The tangent may range from about 0.001 to about 0.02, in some embodiments from about 0.002 to about 0.004. The thickness may range from about 10 microns to about 1000 microns, and in some embodiments from about 100 microns to about 500 microns. For thin organic dielectrics, the thickness of the dielectric may range from about be less than about 50 microns. In some embodiments, the thickness of the dielectric may range from about 0.5 microns to about 50 microns, in some embodiments from about 2 microns to about 40 microns, and in some embodiments from about 10 microns to about 30 microns. The resulting capacitance may be range from picofarads to femptofarads.

Other materials may be utilized, however, including, N6000, epoxy based N4000-13, bromine-free material laminated to LCP, organic layers with high K material, unfilled high-K organic layers, Rogers 4350, Rogers 4003 material (from the Rogers Corporation), and other theremoplastic materials such as hydrocarbon, Teflon, FR4, epoxy, polyamide, polyimide, and acrylate, polyphenylene sulfide resins, polyethylene terephthalate resins, polybutylene terephthalate resins, polyethylene sulfide resins, polyether ketone resins, polytetraflouroethylene resins, BT resin composites (e.g., Speedboard C), thermosets (e.g., Hitachi MCL-LX-67F), and graft resins, or similar low dielectric constant, low-loss organic material.

Regardless of the particular configuration employed, the present inventor has discovered that through selective control over the shape and arrangement of the electrodes, that the capacitance of the resulting capacitor can be precisely controlled and that the resulting capacitor exhibits a high breakdown voltage.

For example, according to aspects of the present disclosure, the capacitor may be generally be easier to manufacture to a precise capacitance specification. For instance, the capacitor may include a first electrode and a second electrode overlapping the first electrode such that an overlapping region is formed. The overlapping region may have an area that is insensitive to a relative misalignment between the first electrode and the second electrode that is less than an offset distance in the first direction.

Additionally, according to aspects of the present disclosure, the capacitor may exhibit an increased breakdown voltage compared with prior art capacitors. Specifically, the capacitor's configuration may provide reduced concentrations of electric charge and electric field in regions prone to breakdown compared with prior art capacitors.

First, the above-described arrangement of overlapping electrodes may increase the breakdown voltage of the capacitor by reducing the concentration of electric charge and electric field at the corners of the dielectric. According to aspects of the present disclosure, the corners of the electrodes are spaced apart from the corners of a charged portion of a dielectric material between the electrodes. Because electric field and charge generally concentrate in the corners of a charged electrode, this reduces the electric field concentration in the corners of the dielectric material. For example, in some embodiments, the electrodes may be sized such that a ratio of the length of a side of the electrode to a corresponding offset distance is less than about 45, in some embodiments less than about 35, in some embodiments less than about 20, in some embodiments less than about 10, in some embodiments less than about 6, and in some embodiments less than about 3.

Dielectric breakdown is caused when the local electric field exceeds the dielectric's capacity, resulting in a flow of current through the dielectric. Reducing the electric field concentration where it is greatest (in the corners of the dielectric), therefore, increases the voltage that may be applied across the parallel electrodes before breakdown occurs (i.e., the breakdown voltage).

Second, aspects of the present disclosure relate to controlling the shape of the electrodes to provide an increased breakdown voltage by reducing electric field/charge concentrations. Because rectangular electrodes concentrate electric field and charge concentrations at their corners, breakdown of the dielectric is more likely to occur near the corners of the dielectric. According to aspects of the present disclosure, at least one electrode may have at least one rounded corner, which may reduce electric field concentrations in the dielectric material. Although the electrodes' corners and the corners of the charged portion of the dielectric generally do not coincide, they may still be relatively close to each other. As a result, reducing charge concentration in the corners of the electrodes further reduces charge concentration in the charged portion of the dielectric. Reducing the charge concentration in turn increases the breakdown voltage compared with an otherwise similar capacitor employing conventional electrodes.

Additionally, in some embodiments, a perimeter of the electrode may be free of geometric discontinuities. For example, rounded corners may continuously blend into adjacent straight edges of the electrode without geometric discontinuity. Geometric discontinuities are generally described with reference to corresponding orders of derivation. For example, shapes may generally be defined by a coordinate function (e.g., Cartesian or polar coordinates). A shape is geometrically continuous if there are no discontinuities in the coordinate function itself. Similarly, a shape is geometrically continuous to a first order if there are no discontinuities in both the coordinate function and its first order derivative. An electrode having a perimeter that is geometrically continuous to at least a first order may further reduce electric field and charge concentrations in the corners and/or along the edges of the electrodes adjacent the corners. This reduction may increase the breakdown voltage of the capacitor compared with conventional electrode designs.

Figure 1:
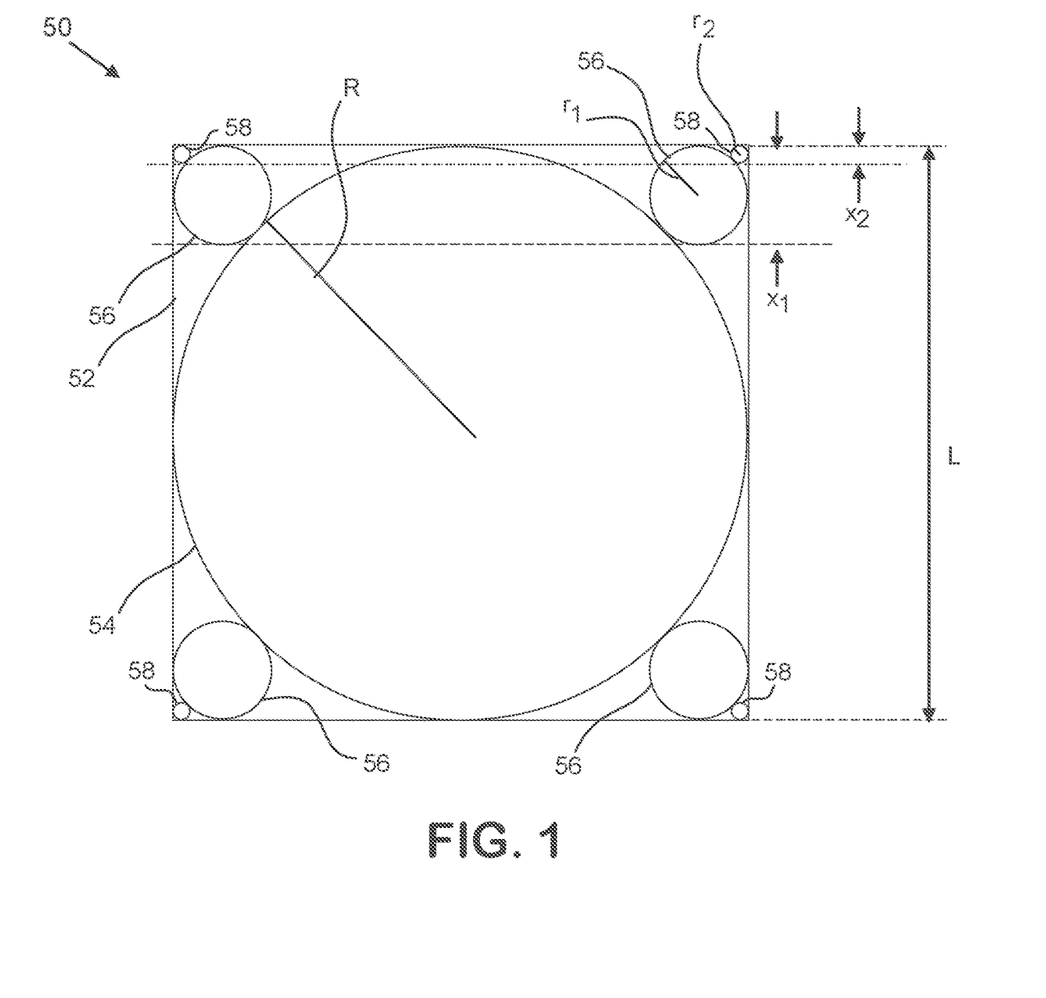
FIG. 1 illustrates an electrical field distribution associated with a parallel electrode configuration.

FIG. 1 is a diagram of a distribution 50 of electrical field through an electrode in a parallel electrode configuration. In this theoretical example, the electrode has a square shape 52 having sides of length L. Without wishing to be bound by theory, charging the electrodes generates an electric field distribution in the dielectric material between the electrodes. The electric field distribution creates a similar electrical charge distribution. A large, central circle 52 is concentric with the square 52 and lies tangent to edges of the square 52 in four locations. The large, central circle 52 has a radius, R, equal to one half of L. A first set of smaller circles 56 are adjacent the corners of the square 52. Each of the four smaller circles 56 lie tangent to the large, central circle 52 and tangent to each adjacent edge of the square 52. This pattern repeats infinitely producing ever small circles.

The large, central circle 52 has an area containing a certain amount of electrical charge. The four smaller circles 56, combined, contain an electrical charge equal to that of the large, central circle 54. This illustrates the manner in which electric field concentrates in the corners of charged electrodes and dielectric materials. This can cause the dielectric material to breakdown, and electrical current to flow between the electrodes.

Figure 2A:
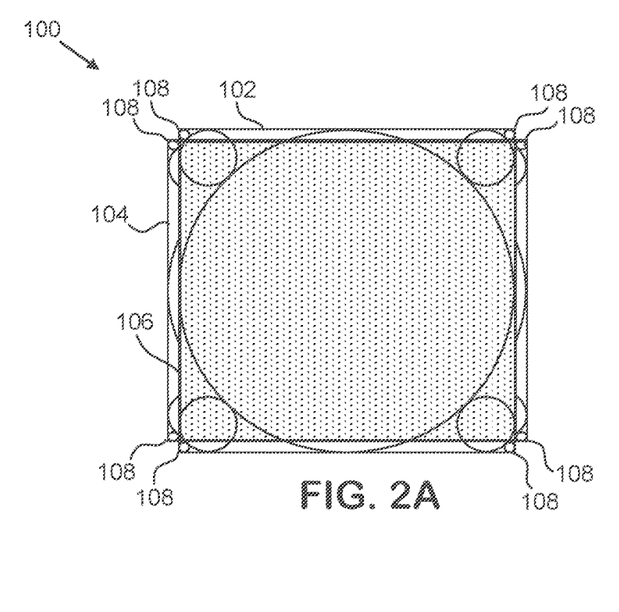
FIGS. 2A through 2C are schematic illustrations of an electrode assembly, a first electrode, and a second electrode, respectively, according to aspects of the present disclosure.
Figure 2B:
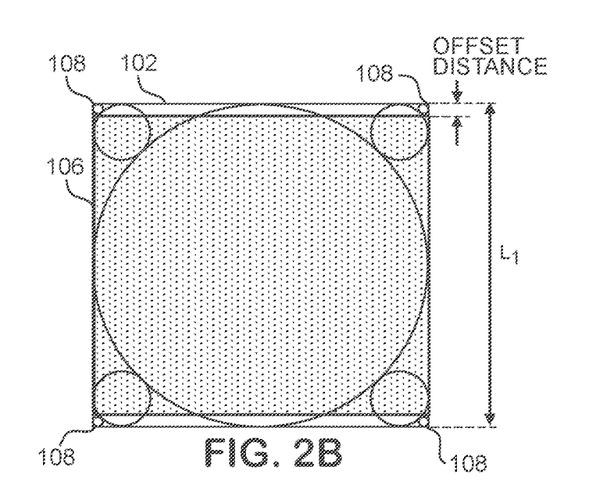
Figure 2C:
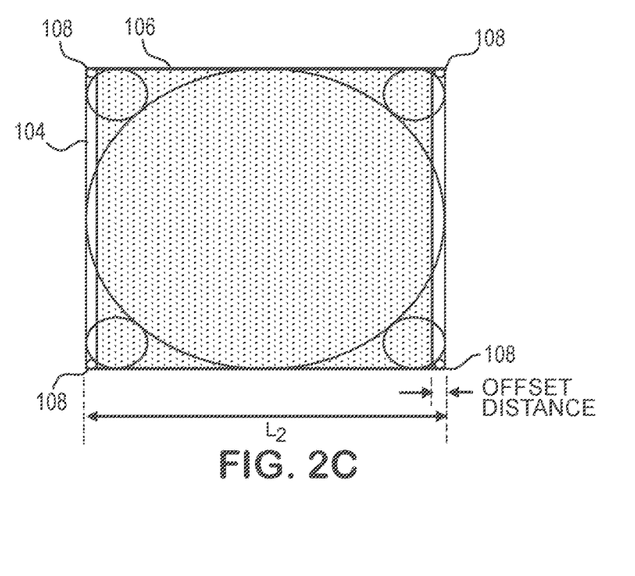

FIGS. 2A through 2C are schematic illustrations of an electrode assembly 100, a first electrode 102, and a second electrode 104, respectively, according to aspects of the present disclosure. The electrodes 102, 104 may be shaped such that an overlapping region 106 is formed. According to aspects of the present disclosure, corners 108 of the electrodes 102, 104 may be spaced apart from the overlapping region 106 by at least an offset distance. This may reduce the effect of the charge concentrations in the corners of the electrodes on the charged portion of the dielectric in the overlapping region 106. As a result, the breakdown voltage may be increased.

For example, the offset distance may be based on the charge concentration described with reference to FIG. 1. Referring again to FIG. 1, a ratio between the radius, R, of the large, central circle 54 and the radii, $r_1$, of the first set of circles 56 can be expressed as follows:

$$\frac{R}{r_1} = \frac{\sqrt{2}+1}{\sqrt{2}-1} \approx 5.83$$

The above relationship also exists between the radii, $r_1$, of the first set of circles 56 and the radii, $r_2$, of the second set of circles 58:

$$\frac{r_1}{r_2} = \frac{\sqrt{2}+1}{\sqrt{2}-1} \approx 5.83$$

A length along the side of the square 52 corresponding to a diameter of the first set of small circles 56 can be represented by $x_1$; and a length of the side of the electrode can be represented by L. From the above relationship between the radii, it can be determined that the ratio of L to $x_1$ can be expressed as follows:

$$\frac{L}{x_1} = \frac{2R}{2r_1} \approx 5.83$$

This corresponds to $x_1$ equaling about 17.2% of L. Similarly, a ratio of L to $x_2$ can be calculated as follows:

$$\frac{L}{x_2} = \frac{R}{r_1} \cdot \frac{r_1}{r_2} \approx 33.97$$

This corresponds to $x_2$ equaling about 2.94% of L.

Referring again to FIGS. 2A through 2C, in some embodiments, the electrodes may be sized such that a ratio of the length of the electrode to an offset distance is less than about 35. By excluding just the second set of four small circles of charge concentration from the overlapping region, the charge concentration in the dielectric may be reduced, resulting in an increase in the breakdown voltage of the capacitor. Depending on space constraints, a ratio of about 45 may sufficiently increase the breakdown voltage without resulting in an electrode assembly that has too large of a footprint.

In other embodiments, the electrodes may be sized such that a ratio of the length of the electrode to the offset distance is less than about 6. As noted above, the concentration of electrical charge contained within the first set of small circles is equal to the concentration of charge contained within the large central circle. Thus, by excluding the first set of four small circles of charge concentration from the overlapping region, the charge concentration in the dielectric may be greatly reduced, resulting in a significant increase in breakdown voltage.

Figure 3A:
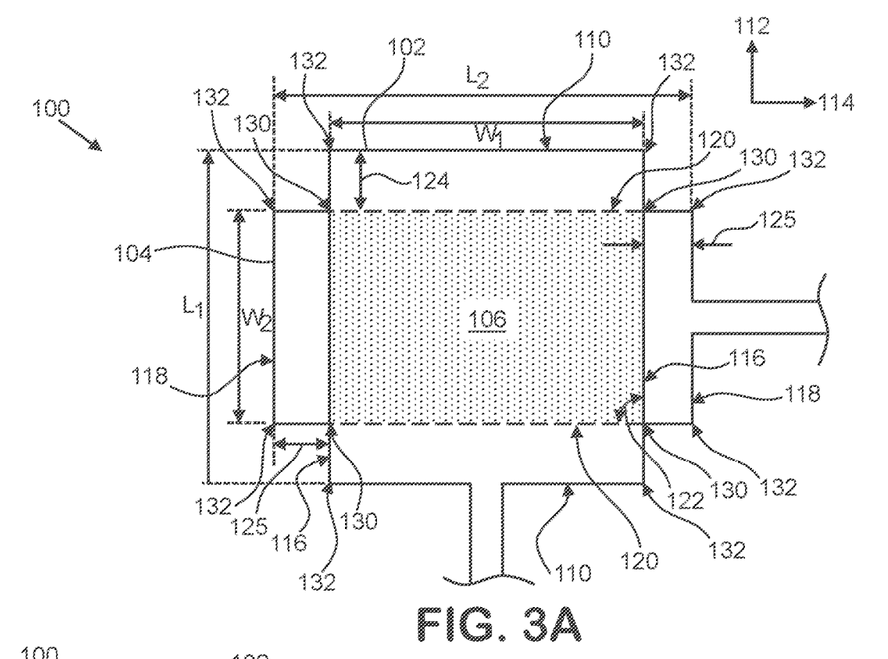
FIGS. 3A and 3B illustrate a top down view and side view, respectively, of an electrode assembly according to aspects of the present disclosure.
Figure 3B:
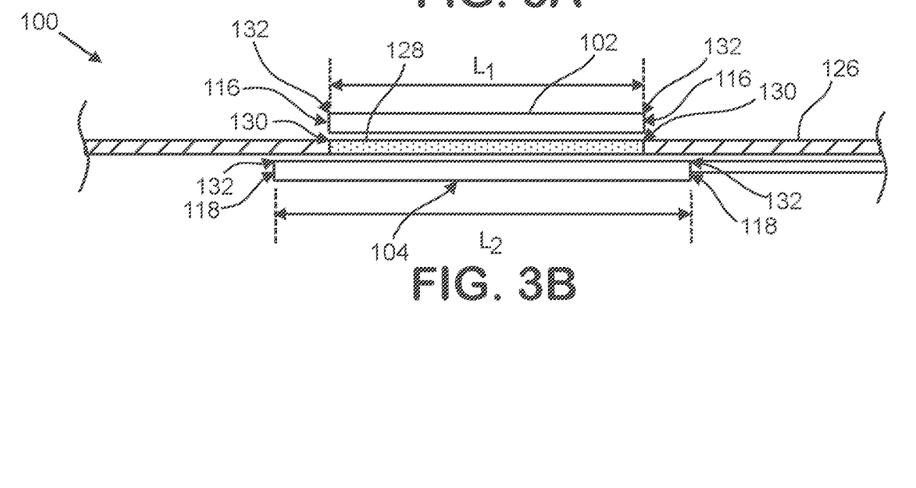

FIGS. 3A and 3B illustrate a top down and side view, respectively, of an electrode assembly 100 according to aspects of the present disclosure. The electrode assembly 100 may include a first electrode 102 and a second electrode 104. The first and second electrodes 102, 104 may form an overlapping region 106.

The first electrode 102 may have a generally planar shape. The first electrode 102 may have a pair of opposite first edges 110 and a length (represented by $L_1$ in FIG. 3A) therebetween in a first direction 112. The pair of first edges 110 may be generally parallel and extend in a second direction 114. The first electrode 102 may also have a width (represented by $W_1$) in the second direction 114 between a pair of second edges 116 that extend in the first direction 112.

The second electrode 104 may also have a generally planar shape. The second electrode 104 may have a pair of first edges 118 and a length (represented by $L_2$ in FIG. 3A) therebetween in the second direction 114. The first edges 118 may generally extend in the first direction 112. The second electrode 104 may also have a width (represented by $W_2$) in the first direction 112 between a pair of second edges 120 that extend in the second direction 114.

An overlapping region 106 may be formed where the first and second electrodes 102, 104 overlap. The overlapping region 106 may have a length in the first direction 112 equal to the width, $W_2$, of the second electrode 104 and a length in the second direction 114 equal to the width, $W_1$, of the first electrode 102. The overlapping region 106 may generally have a parallelogram shape and have a perimeter that includes the pair of first edges 116 of the first electrode 102 and the pair of second edges 120 of the second electrode 104 located in between the pair of first edges 116 of the first electrode 102.

Although illustrated as rectangular, it should be understood that, in some embodiments, the parallelogram shape of the overlapping region 106 may not be rectangular. For example, in some embodiments, a placement angle 122 may be formed between first edges 116 of the first electrode 102 and the second edges 120 of the second electrode 104. The placement angle 122 may range from about 10 degrees to about 170 degrees, in some embodiments, from about 45 degrees to about 135 degrees, and in some embodiments from about 85 degrees to about 95 degrees.

The electrodes 102, 104 may generally be placed and sized such that a first offset distance 124 is defined in the first direction 112 between the first edges 110 of the first electrode 102 and the second edges 120 of the second electrode 104. Similarly, a second offset distance 125 is defined in the second direction 114 between the second edges 116 of the first electrode 102 and the first edges 118 of the second electrode 104. Generally the offset distances 124, 125 will be equal to each other and symmetric on each side of the electrodes 102, 104. In some embodiments, however, the offset distances 124, 125 may be different. For example, the first offset distance 124 may be different than the second offset distance 125. In some embodiments, the first offset distance 124 on one side of the electrode assembly 100 may be different than the first offset distance 124 on the opposite side of the electrode assembly 100. Similarly, in some embodiments, the second offset distance 125 on one side of the electrode assembly 100 may be different than the second offset distance 125 on the opposite side of the electrode assembly 100.

During manufacturing, variations in the relative placement of the electrodes 102, 104 does not affect the area of the overlapping region 106 as long as such variations are less than the respective offset distances 124, 125. For instance, if the second electrode 104 is misplaced in the first direction 112, then any overlapping area that is lost on one side of the second electrode 104 would be replaced by an equal amount of additional area on the opposite side of the second electrode 104. Similarly, minor variations in the placement angle 122 will not affect the area of the overlapping region 106. This results in an electrode assembly 110 that is generally unaffected by small placement errors. Thus, the electrode assembly 100 may be described as "self-aligning" because the degree of precision required to position the electrodes 102, 104 is decreased. Instead, the configuration of the electrodes 102, 104 can be said to align themselves to provide the overlapping region 106 with a prescribed area, and thus capacitance.

Additionally, because the lengths of electrodes 102, 104 do not affect the area of the overlapping region 106, these lengths may not need to be as precisely controlled during manufacturing. This may provide greater control over the resulting capacitance because only one dimension (e.g., the width) of each electrode 102, 104 must be precisely controlled to effectively control the area of the overlapping region 106.

Referring to FIG. 3B, a dielectric material 126 may be located between the first and second electrodes 102, 104. An electric field may be formed in a charged portion 128 of the dielectric material 126 in the overlapping region 106. The charged portion of the dielectric 126 may have corners 130 generally coinciding with the corners of the overlapping region 106. Each of the electrodes 102, 104 may also generally have electrode corners 132. The electrode corners 132 are generally spaced apart from the corners 130 of the charged portion 128 of the dielectric material 126. This may help reduce the electric field concentration at the corners 130 of the charged portion 128 of the dielectric material 126.

Figure 4:
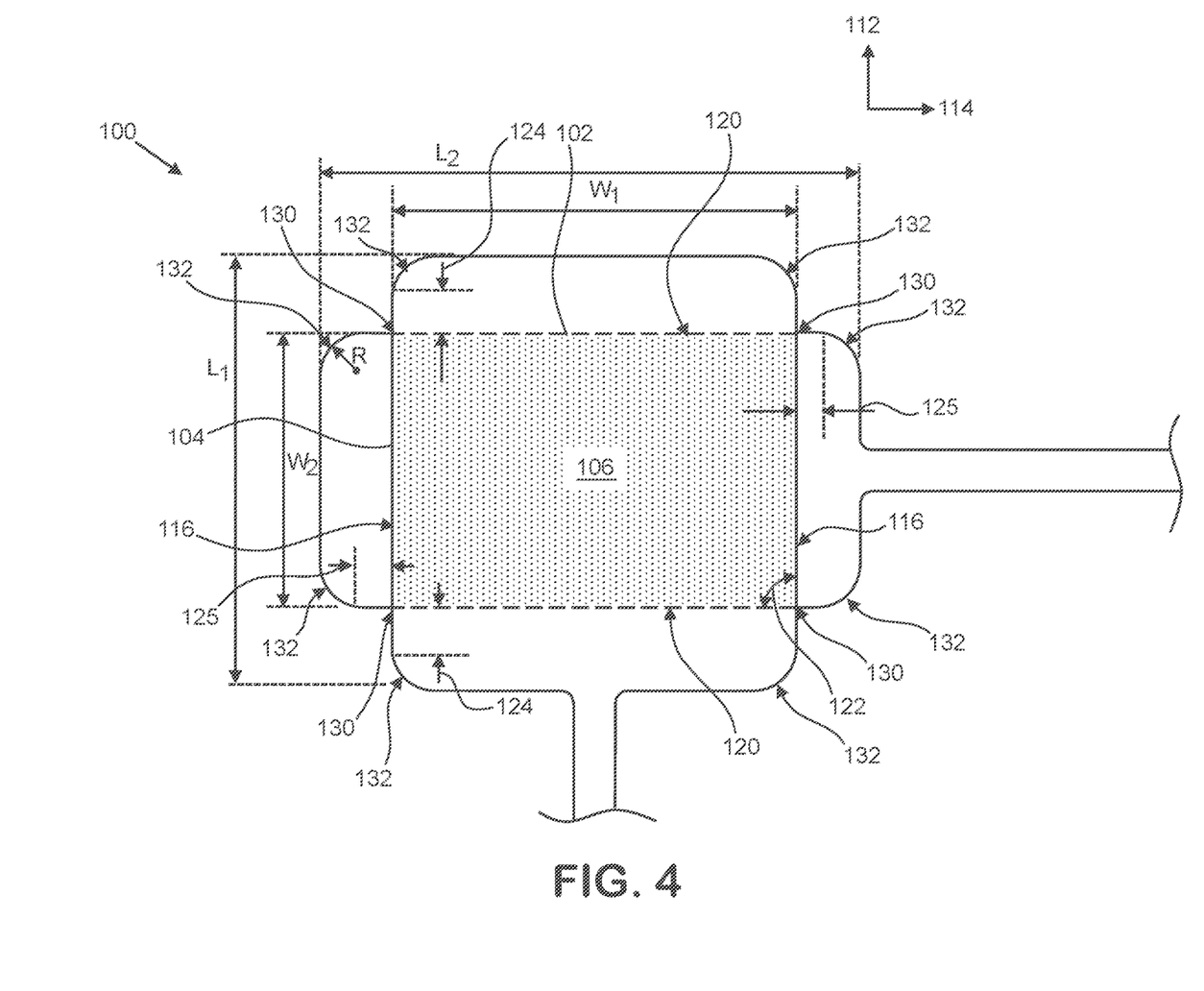
FIG. 4 illustrates an electrode assembly in which at least one of the first electrode or second electrode has at least one rounded corner in accordance with aspects of the present disclosure.

FIG. 4 illustrates an electrode assembly 100 in which at least one of the first electrode 102 or second electrode 104 has at least one rounded corner 132 in accordance with aspects of the present disclosure. The first and second electrodes 102, 104 may have lengths (represented by $L_1$ and $L_2$, respectively) and widths (represented by $W_1$ and $W_2$, respectively). An overlapping region 106 may be defined in a similar manner as described above with reference to FIGS. 3A and 3B.

In some embodiments, each corner 132 of the first electrode 102 and each corner 132 of the second electrode 104 may be rounded. As used herein, "rounded," may refer to a perimeter having the shape of a circular or elliptical arc. "Rounded," may also refer to any suitable edge that is not precisely circular or elliptical, but is otherwise curved/arcuate. Additionally, in some embodiments, a perimeter of the first electrode 102 and/or second electrode 104 may be free of geometric discontinuities. For example, the rounded corners 132 may continuously blend into an adjacent straight edges without any geometric discontinuities. In some embodiments, at least one of the first electrode 102 and/or second electrode 104 may have a shape that is geometrically continuous. In other words, there may be no discontinuities in a coordinate function that describes the shape (e.g., in Cartesian or polar coordinates). In some embodiments, the shape may be geometrically continuous to a first order. In other words, a first order derivative of a coordinate function that describes the shape of the first electrode 102 and/or second electrode 104 may contain no discontinuities.

As a result of the rounded corner(s) 132, the electrode assembly 100 described with reference to FIG. 4 may be unaffected by relative misalignment of the electrodes 102, 104 up until a portion of one of the rounded corners 132 of the electrodes 102, 104 overlaps. In this embodiment, the offset distances 124, 125 are shortened compared with the embodiment described with reference to FIGS. 3A and 3B as a result of the rounded corner(s) 132. For example, the offset distances 124, 125 may be measured between the edge of the overlapping region 106 and a start of a curved portion of the adjacent corner 132. It should be understood that the relative sizes of the electrodes 102, 104 may be adjusted to accommodate the anticipated placement variation expected during manufacturing. In other words, the electrodes 102, 104 may generally be sized slightly larger to accommodate the rounded corner(s) 132.

This configuration may reduce electric field and charge concentrations in the corners 132 and/or along the edges of the electrodes 102, 104 adjacent the corners 132. Such a reduction may increase the breakdown voltage of a capacitor incorporating the electrode assembly 100 compared with conventional electrode configurations.

Figure 5:
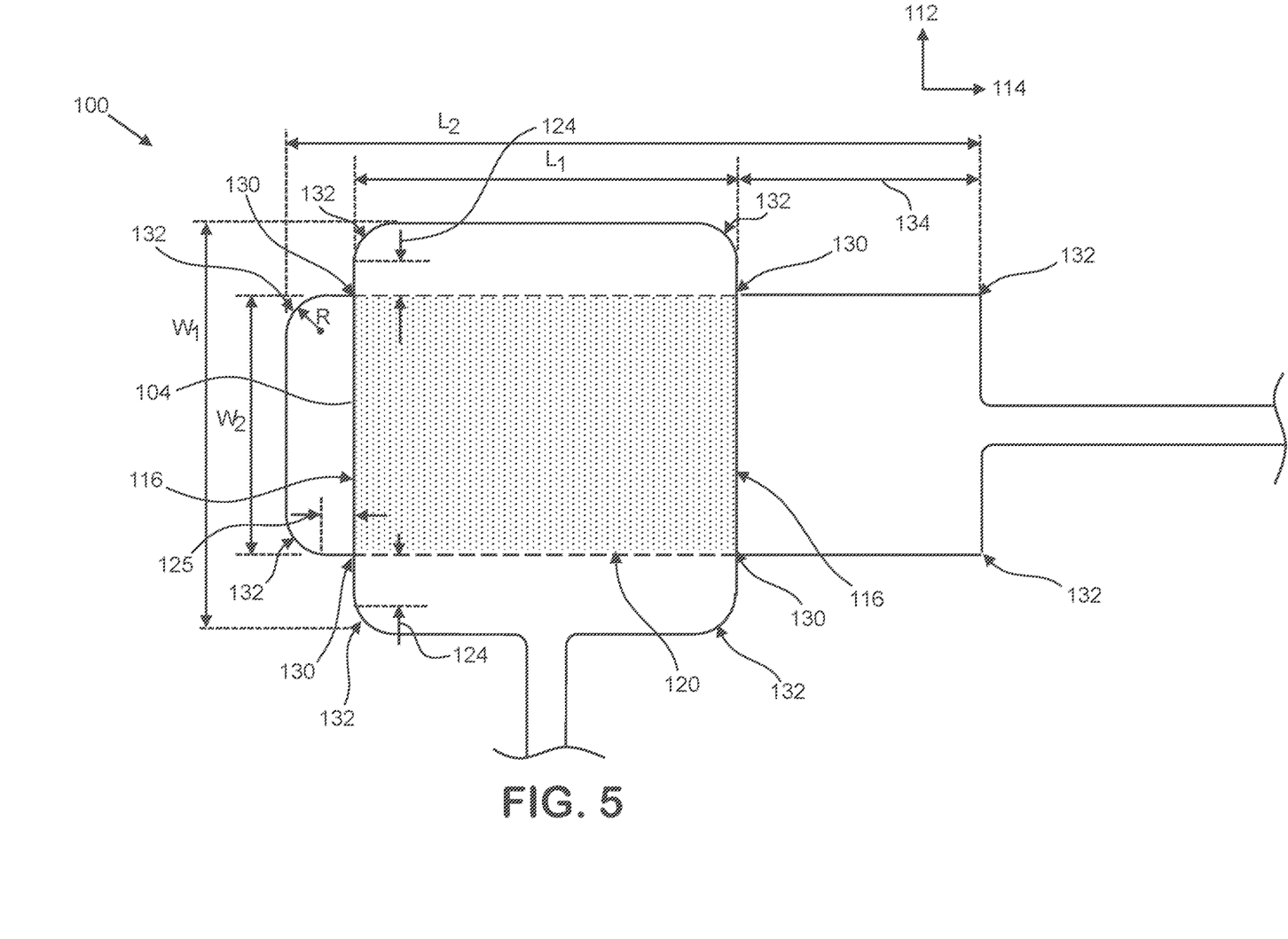
FIG. 5 illustrates another embodiment of an electrode assembly in which some of the electrode corners are rounded and other electrode corners are not rounded.

FIG. 5 illustrates another embodiment of the electrode assembly 100 in which some of the electrode corners 132 are rounded and others are not rounded. For example, in one embodiment, the second electrode 104 may have two rounded corners 132 that are adjacent the first electrode 102 and two non-rounded corners 132 that are spaced apart from the first electrode 102 by an increased second offset distance 134, which is greater than the second offset distance 125 on the opposite side of the electrode assembly 100. Such a configuration may reduce the electric field concentration near the charged portion 128 of the dielectric 126. While the electric field may concentrate locally at the non-rounded corners 132, the charged portion of the dielectric 126 may remain substantially unaffected because of the spacing between the charged portion of the dielectric 128 and the non-rounded corners 132 of the second electrode. Producing rounded corners may involve additional manufacturing cost compared with non-rounded corners. Thus, this configuration may provide similar benefits to the embodiment described with reference to FIG. 4, with reduced manufacturing costs.

It should be understood that additional configurations with respect to the rounded and non-rounded corners 132 are possible within the scope of this disclosure. For example, in some embodiments, the first electrode 102 may similarly have two non-rounded corners 132 that are spaced apart from the second electrode 104. In other embodiments, the first electrode 102 may not have any rounded corners 132 while the second electrode 104 has only rounded corners. Other variations are combinations are possible within the scope of this disclosure.

Figure 6A:
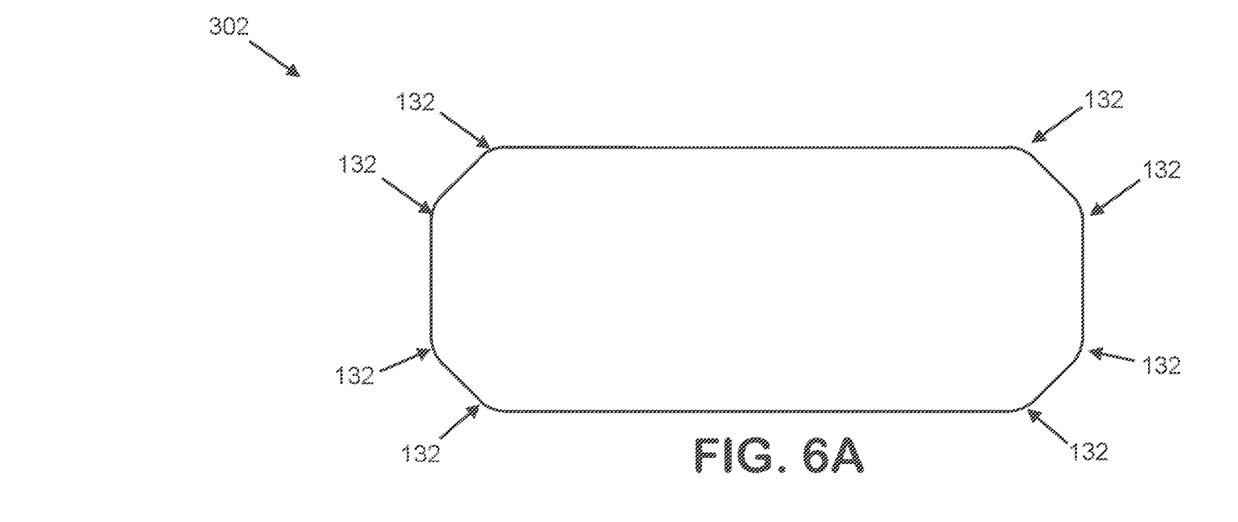
FIGS. 6A and 6B illustrate alternative electrode configurations.
Figure 6B:
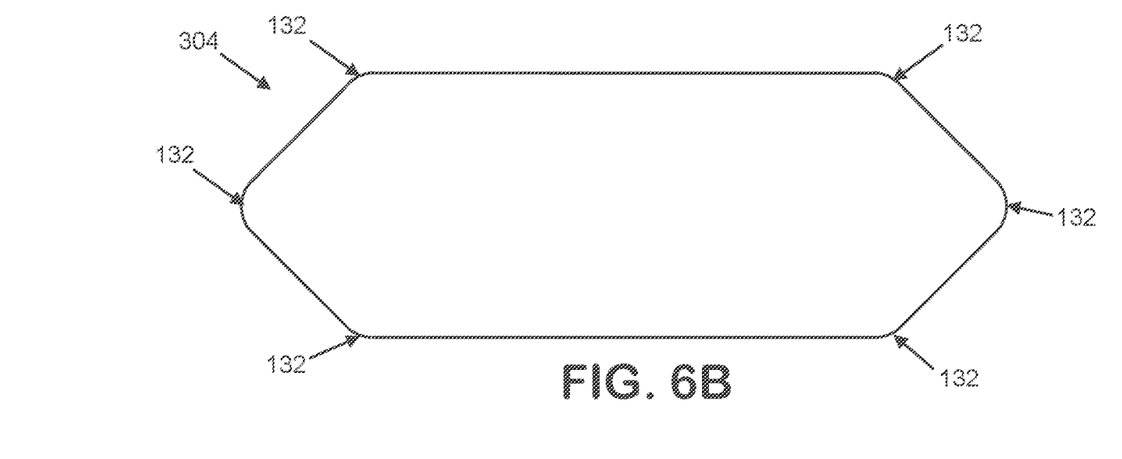

For example, FIGS. 6A and 6B illustrate alternative electrode configurations 302, 304 having rounded corners 132. FIG. 6A illustrates an electrode having rounded, chamfered corners 132. FIG. 6B illustrates an electrode having three rounded corners 132 at each end. Other configurations and combinations are possible within the scope of this disclosure.

Applications

As indicated above, the presently disclosed capacitor may find application in a variety of electronic devices, including for example, multilayer ceramic capacitors, thin film capacitors, thick film capacitors, and supercapacitors.

Figure 7:
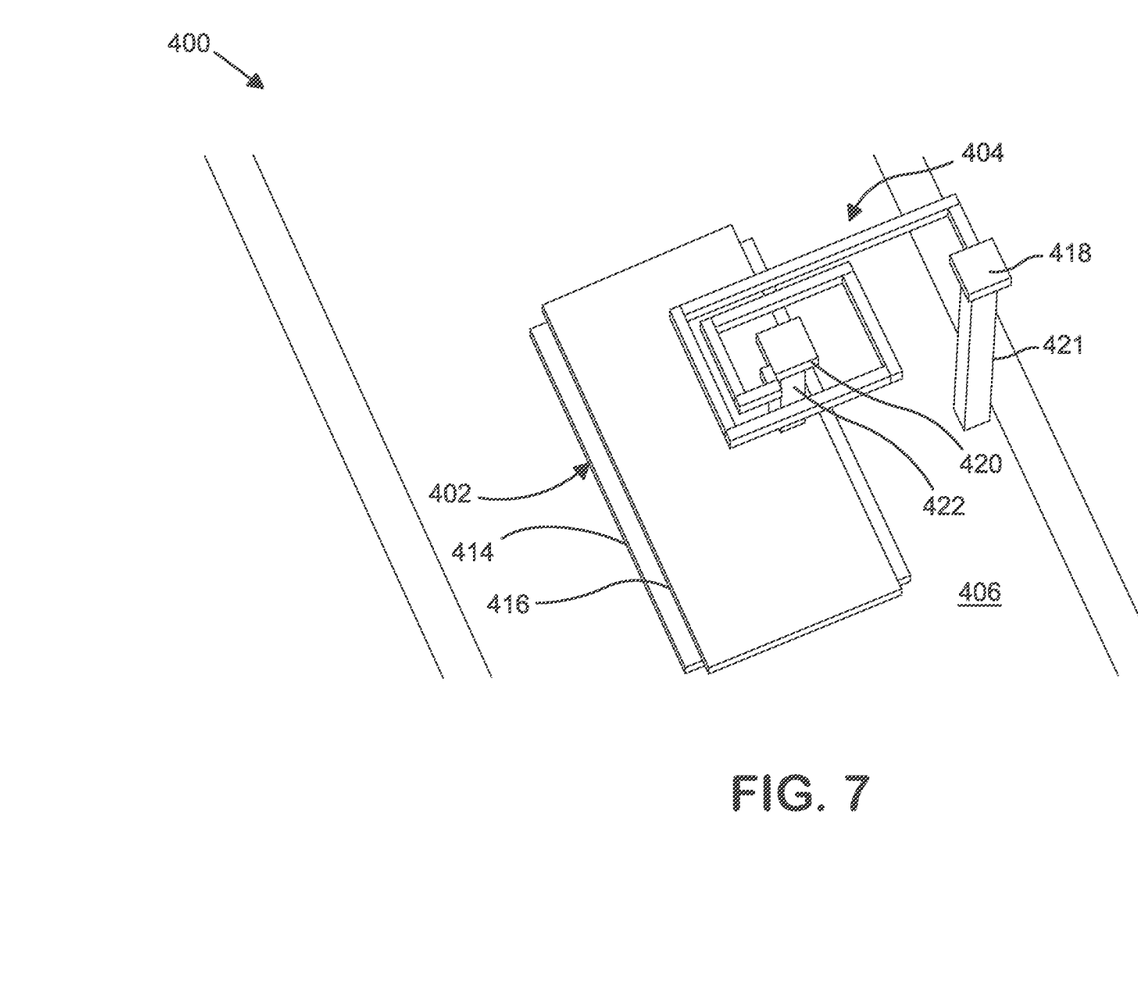
FIG. 7 is a three-dimensional perspective view of a simplified multilayer organic device including a self-aligning capacitor according to aspects of the present disclosure.

The presently disclosed capacitor may find particular application in multilayer organic components. FIG. 7 is a three-dimensional perspective view of a simplified multilayer organic device 400 including a self-aligning capacitor 402 according to aspects of the present disclosure. The multilayer organic device 400 may also include an inductor 404 and a ground plane 406.

The self-aligning capacitor 402 may include a first electrode 414 and a second electrode 416 and may be generally configured as explained above with reference to any of FIGS. 2A through 6B. The first electrode 416 may be located on the ground plane 406 and electrically connected therewith.

The inductor 404 may include a first connection point 418 and a second connection point 420. A first plated via 422 may electrically connect the second connection point 420 of the first inductor 404 with the second electrode 416 of the self-aligning capacitor 402. A second plated via 421 may electrically connect the first connection point 418 with the ground plane 406.

The plated vias 422, 424 which may be a microvias, may be created by drilling (e.g., mechanical, laser drilling, etc.) through holes (perhaps as small in diameter as the thickness of the dielectric used) and plating the through holes with a conductive material, such as electroless or seeded copper.

The inductor 404 may be formed by electroplating (electroless or vacuum deposition) and etching metallization layers to define the shape of the inductors 402, 404. The metallization layers may be formed from copper, nickel, gold, silver, or other metals or alloys.

The self-aligning capacitor 402 may include an organic dielectric layer comprising at least one of the following types of organic materials: polyphenyl ether (PPE) based materials, such as LD621 from Polyclad and N6000 series from Park/Nelco Corporation, liquid crystalline polymer (LCP), such as LCP from Rogers Corporation or W. L. Gore & Associates, Inc., hydrocarbon composites, such as 4000 series from Rogers Corporation, and epoxy-based laminates, such as N4000 series from Park/Nelco Corp. For instance, examples include epoxy based N4000-13, bromine-free material laminated to LCP, organic layers with high K material, unfilled high-K organic layers, Rogers 4350, Rogers 4003 material, and other theremoplastic materials such as polyphenylene sulfide resins, polyethylene terephthalate resins, polybutylene terephthalate resins, polyethylene sulfide resins, polyether ketone resins, polytetraflouroethylene resins and graft resins, or similar low dielectric constant, low-loss organic material.

The dielectric constant may be between approximately 2 and 100, the loss may be less than approximately 0.01, and the thickness may be between approximately 10 microns and 1000 microns. For thin organic dielectrics (e.g., approximately less than 50 microns in thickness) the resulting capacitance may be range from picofarads to femptofarads.

Other material may be utilized, however, including, N6000, epoxy based N4000-13, bromine-free material laminated to LCP, organic layers with high K material, unfilled high-K organic layers, Rogers 4350, Rogers 4003 material (from the Rogers Corporation), and other theremoplastic materials such as hydrocarbon, Teflon, FR4, epoxy, polyamide, polyimide, and acrylate, polyphenylene sulfide resins, polyethylene terephthalate resins, polybutylene terephthalate resins, polyethylene sulfide resins, polyether ketone resins, polytetraflouroethylene resins and graft resins, or similar low dielectric constant, low-loss organic material. The organic dielectric layers may have a dielectric constant of less than approximately 3.1 and a dielectric loss of less than about 0.004.

Additionally, organic laminate layers may be formed of an organic buildup material such as laminate LCP or polyphenyl ether (PPE), although other materials may be utilized, including prepreg, bond ply, or other thermosetting polymer including epoxy resins, phenolic resins, unsaturated polyester resins, phenolic resins, unsaturated polyester resins, polyimide resins, cyanate resins, polyphenylene ether resins, furmate resins, and polybutadiene resins. The organic laminate layers may have a dielectric constant of less than about 3.5 and a dielectric loss of less than about 0.004.

Aspects of the present disclosure may find particular application with bandpass filters. The application and scope of the present disclosure, however, is not limited to bandpass filters, but is inclusive of any suitable device which may benefit from the ability to precisely control the capacitance of a capacitor. Additional examples include, but are not limited to, diplexer, duplexer, multiplexer, baluns, power combiner, band-stop/band elimination filter, power divider, low-pass filter, high-pass filter, voltage controlled oscillators (VCOs), and low noise amplifiers (LNAs).

Figure 8:
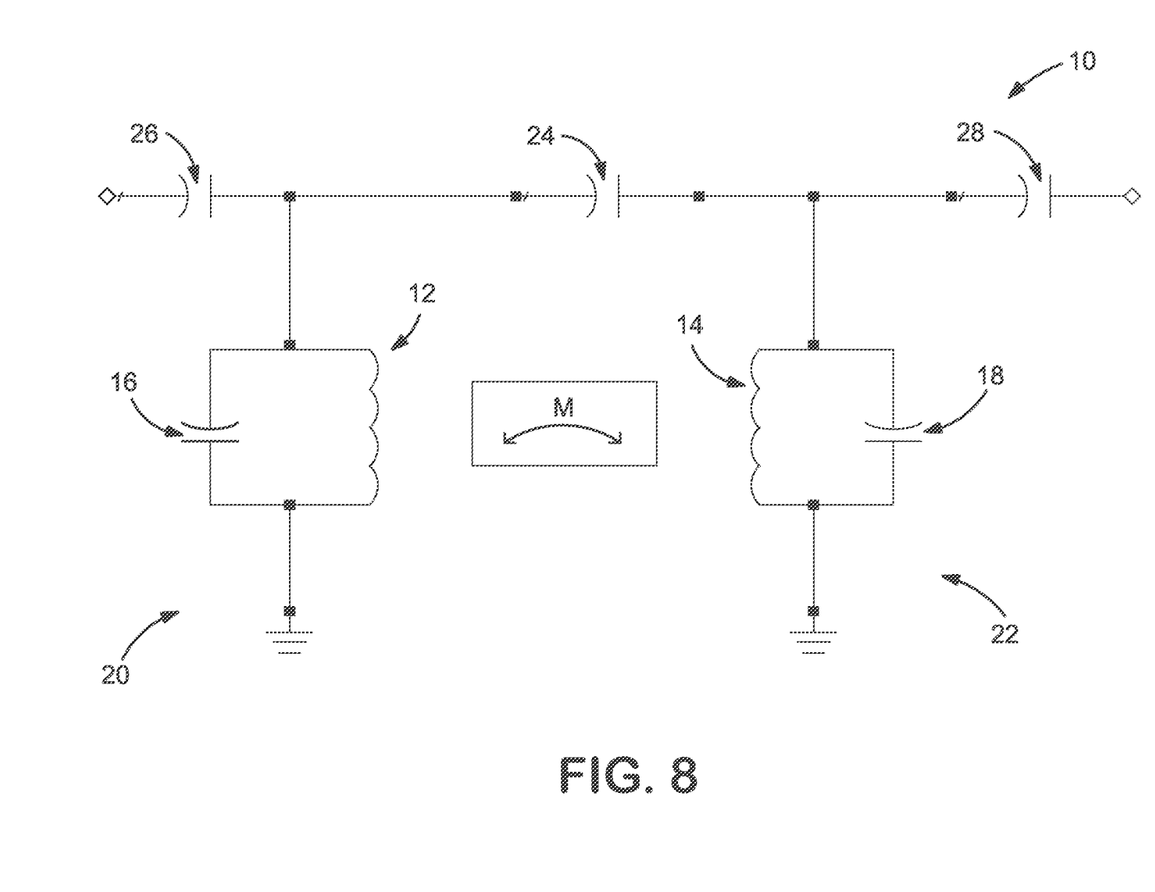
FIG. 8 is an equivalent circuit diagram of a dielectric bandpass filter in accordance with an embodiment of the present invention.

FIG. 8 is an equivalent circuit diagram of a dielectric bandpass filter 10 in accordance with an embodiment of the present invention. In FIG. 8, inductors 12, 14 cooperate with their corresponding capacitor 16, 18, respectively, to form resonators 20, 22, respectively. The inductors 12, 14 may correspond to a stripline or CPW/strip-line or CPW-microstrip inductor configuration. In some embodiments, the inductors are etched metallizations as described above with reference to FIG. 7. The capacitors 16 and 18, respectively, correspond to the capacitors formed on the same layer as inductors 12 and 14 or by using discrete capacitors. The capacitor 24 corresponds to the capacitor formed for the purposes of inter-resonator coupling. In FIG. 8, capacitors 26 and 28, respectively, provide matching to the desired impedances at the input and output. In addition, M is the magnetic coupling between the inductors 12 and 14. The inductances of inductors 12 and 14 could also represent equivalent inductance components of the resonators, and capacitances of capacitors 16 and 18 could represent capacitance components of the resonators. While the circuit topology shown in FIG. 8 depicts one embodiment of a two pole filter, and an additional pole can be attained by the mutual inductance between inductors 12, 14 and the capacitor 24. In addition, resonators may be added with the required coupling elements by adding more inductors and capacitors in various configurations to achieve transfer characteristics that emulate such responses as first order, second order to nth order butterworth, chebychev, elliptic, blinkoff, symmetric, asymmetric, notch added filters using topologies such as nodal capacitor coupled, nodal-inductor coupled, shunt-input geometry, input geometry or mesh capacitor coupled.

Figure 9A:
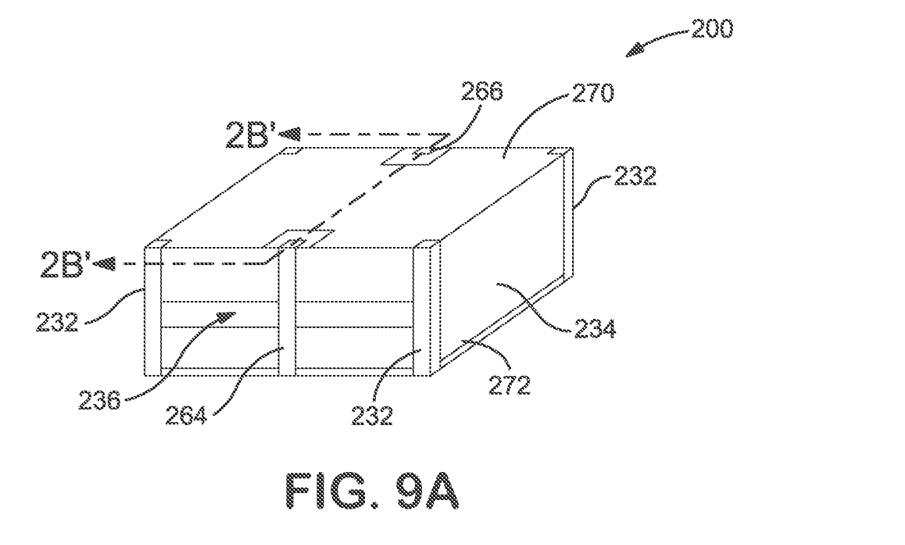
FIGS. 9A-9C illustrate, respectively, a perspective view, a section view, and an exploded perspective view of a surface mounted device (SMD) embodiment of a filter, in accordance with aspects of the present disclosure.
Figure 9B:
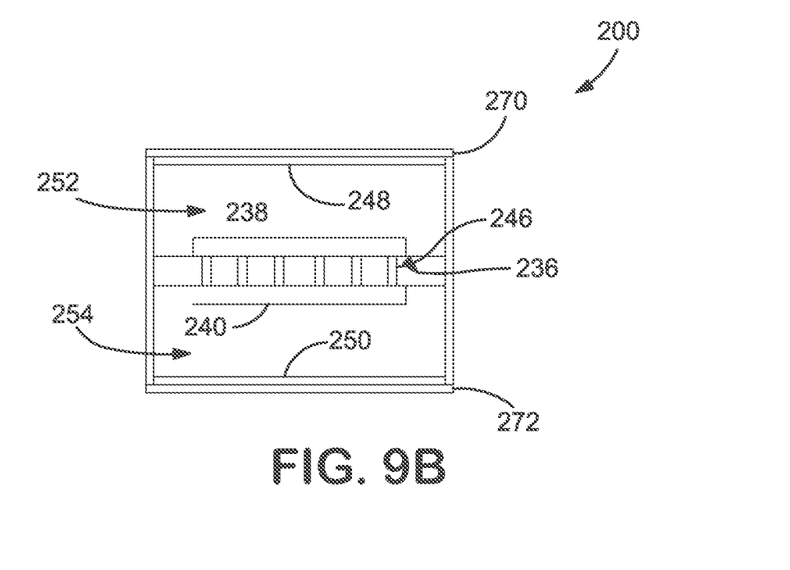
Figure 9C:
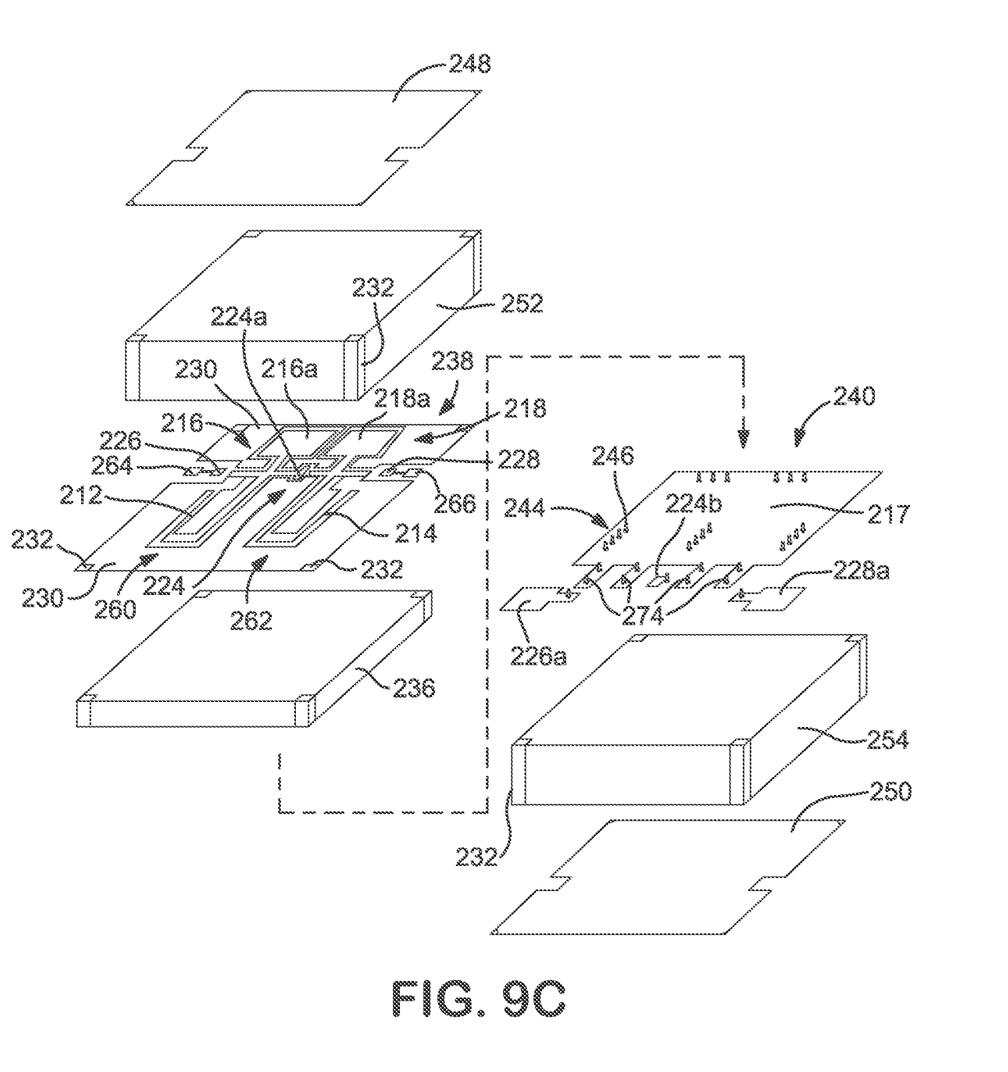

FIGS. 9A-9C illustrate a surface mounted device (SMD) embodiment of the filter 10 described above with reference to FIG. 8 in accordance with aspects of the present disclosure. Specifically, an organic bandpass filter 200 may employ self-aligning capacitors as described herein in place of any one or more of the capacitors described below.

The organic bandpass filter 200 may include inductors 212 and 214, which may be meandering inductors formed close to each other on an organic dielectric layer 236 (which can be a thin laminate such as LCP or PPE, but is not limited to these) and is preferably configured as either a shorted hybrid CPW-stripline (where lines that form meandering inductors 212 and 214 are connected to a coplanar ground, that is, in-built shielding 230), or a stripline in the presence of coplanar in-built shielding 230 and additional grounds 248 and 250 that are connected to the plated through holes 232 and/or external shield electrodes 234.

Since these inductors are very close to each other, the magnetic coupling between these filters, represented by M in FIG. 8, can increase the pass bandwidth of the filter, thereby decreasing its performance. However, referring to FIG. 9C, an inter-resonator parallel plate coupling capacitor 224, (with or without the coplanar in-built shielding 230) formed using two disconnected metal plates (one plate formed using patterning conductive layer 238 and the other plate formed using patterned conductive layer 240) and shown as capacitor plates 224 a, 224 b is provided. The capacitor plates 224 a, 224 b sandwich the first organic dielectric layer 236 in such a manner that the each plate of the inter-resonator coupling capacitor electrode is connected to separate resonators which helps compensate the effect of the magnetic coupling and helps make very compact filters. The center capacitance can be as small as femptoFarads or as large as picoFarads for achieving the specified bandwidths. The smaller capacitance helps reduce the bandwidth. Additionally, capacitor 224 in parallel with the mutual inductance equivalent gives a pole in the lower band or upper band. In some embodiments, the coupling capacitor 224 may be a self-aligning capacitor as described in with reference to any of FIGS. 2-7.

The bottom plate formed by the conductive layer 240 connects to inductor 212 using one or more microvias in the organic dielectric layer 236, such as the vias 244 with pads 246 for landing and capturing the via. First and second shield electrodes 248, 250 formed respectively on the organic core layers 252, 254, wherein the core layer 252 and 254 are disposed so as to sandwich the organic dielectric layer 236 there between. A first resonator 260 formed by inductor 212 and capacitor 216 and a second resonator 262 formed by inductor 214 and capacitor 218 are electrically coupled to each other through the parallel plate capacitor 224, whereby an inter-resonator coupling is effected in combination with said magnetic coupling and electric coupling. One of more of the capacitors 216, 218 may be self-aligning capacitors as described in with reference to any of FIGS. 2-7.

In a dielectric filter according to an embodiment of the present invention, where the inductors do not provide the needed capacitance in the desired length, the inductors 212, 214 can be connected in similar fashion as the capacitor 224 to separate grounded/shunted parallel plates 216a and 218a, respectively, of capacitors 216 and 218, respectively, using the same first organic dielectric layer 236 as the sandwiched dielectric, which then together form the resonator pairs 260, 262.

The equivalent inductance L obtained with one of the meander inductors, 212, 214, and the equivalent capacitance C due to one of the capacitors 216, 218, resonates approximately at frequency Fo, the center frequency of the filter, as defined below:

$$Fo \sim \sqrt{\frac{1}{LC}}$$

The capacitor plates 216a and 218a have a corresponding ground plate 217 on the opposite surface of the organic dielectric layer 236. Having a common plate does cause coupling between the capacitors which has to be accounted for during the design by including it as the mutual inductance between the parasitic inductance of each capacitor 216, 218. This coupling can be used to achieve further poles; however if the coupling causes problems in the passband during the synthesis stage it could be reduced by either dividing plate 217 into separate plates or by adding several vias on pads 274 that connect plate 217 to in-built shielding 230 on the side of the inductors 212 and 214, thereby helping excess currents to sink and thereby reducing coupling between components.

In addition, parallel plate/interdigital capacitors 226 and 228, can be used on either side of the first and last resonator elements 260, 262 at the input and output terminals of the device for impedance matching purposes. One of more of the capacitors 226, 228 may be self-aligning capacitors as described in with reference to any of FIGS. 2-7. Alternatively, inductors or transmission lines or a combination of capacitor(s), inductor(s) and transmission line(s) can be utilized, as desired. If capacitors 226, 228 are used for matching purposes, it follows the center capacitance is that of capacitor 224 in terms of the nominal capacitances required, that is, the capacitance from capacitor 226 and capacitor 228 are proportional to capacitor 224.

A dielectric filter according to the embodiment of the present invention illustrated in FIGS. 2A-2C can comprise at least two external shield electrodes 234 respectively formed on different side surfaces of the laminated structure, which comprises at least the organic dielectric layer 252, 236, 254, and that are connected to the shield electrodes 248 and 250. This may or may not be desired for shielding purposes in a CPW topology, wherein the use of plated through holes 232 on the four corners is sufficient. Utilizing the plated through holes 232 may save additional room required for the external shield electrodes 234 and also may save the processing cost involved. However, in stripline and microstrip filter topologies, plated through holes 232 and external shield electrodes 234 together provide the connection for the shorted inductors/resonators and capacitors at any point along the respective sides. Alternatively, the CPW topology with coplanar in-built shielding 230 on the same plane of the first dielectric layer provides the shielding internally, and provides for the ground connectivity to the resonators/inductors and capacitors. However, in general, in more noisy environments it may be preferred to also have the external ground electrodes.

The dielectric filter 200 may also comprises an external input terminal electrode 264 and an external output terminal electrode 266 which are formed on one side surface of a laminated body comprising at least dielectric sheets 252, 236, 254, and an external ground electrode, (such as shield electrodes 248, 250, through holes 232 or side shield electrodes 234) formed between said external input and output terminal electrodes 264, 266 on one side surface.

The shield electrodes 248 and 250 formed on the dielectric core layers 252 and 254, respectively, are preferably of the shape and patterned to leave room for the landing terminals of input and output terminal electrodes 264 and 266. For purposes of illustrating the an exemplary embodiment of the present invention, the shield electrodes 248, 250 are shown in FIGS. 2B and 2C, but not 2A.

The first organic dielectric layer 236 can comprise single side copper LCP laminate or the like, such as PPE, N6000, epoxy based N4000-13, or any other suitable low loss dielectric, as described herein.

The protective layers 270, 272 are formed on shield electrodes 248, 250 opposite dielectric core layers 252, 254, respectively, to protect the structure from environmental effects such as oxidation and also to create a pattern for solder to flow on to the input output terminals 264 and 266 and ground pads formed by plated through holes 232. The protective layers 270, 272 may comprise a solder mask, or in more demanding applications, with higher tolerances, other materials such as prepreg or LCP may be desired. For purposes of illustrating an exemplary embodiment of the present invention, the protective layers 270, 272 are shown in FIGS. 2A and 2B, but not 2C.

In the dielectric filter according to an embodiment of the present invention, as illustrated in FIGS. 9A-9C, an initial step to making a connection between devices using vias 244 can done by drilling through holes (as small in diameters as the thickness of the dielectric used) through the LCP layer (or any other appropriate organic dielectric) and copper layer. Then both sides of LCP copper laminate are metallized, such as by electroless or vacuum deposited copper. Copper is then electroplated on both sides of laminate to form the metallized patterns 238, 240 on the organic dielectric layer 236. The copper is then printed and etched to define the key filter components.

In the dielectric filter according to the embodiment illustrated in FIGS. 9A-9C, the dielectric core layers 252, 254 can be laminate LCP or appropriate dielectric with generally larger thickness than the first substrate and aluminum, copper, Molybenum metal (for high power applications) on both sides of filter to a given thickness to encapsulate components. All metals are preferably electroplated and etched and patterned on top and bottom of the device to leave space for signal input and output.

In a dielectric filter according to the embodiment illustrated in FIGS. 9A-9C, the side wall ground shield electrodes 232, 234 can be fabricated, if desired, by single or multiple connected drilled and plated through holes or using a saw cutting device and then connected via electroless or sputter seeded copper in through hole. The copper can be electroplated in the through hole and on the surface. The copper can then be printed and etched to form SMD connection.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrode assembly comprising:
   a first electrode having a generally planar shape and a length in a first direction; and
   a second electrode having a generally planar shape and a length in a second direction, the second electrode overlapping the first electrode such that an overlapping region is formed, the overlapping region having an area that is insensitive to a relative misalignment in the first direction between the first electrode and the second electrode that is less than a first offset distance, and the area of the overlapping region is insensitive to a relative misalignment in the second direction between the first electrode and the second electrode that is less than a second offset distance in the second direction;
   wherein a ratio of the length of the first electrode to the first offset distance is less than about 3, and a ratio of the length of the second electrode to the second offset distance is less than about 3,
   wherein the first electrode has a rounded corner, the rounded corner having a start where a curved portion of the rounded corner begins, the start located along the length of the first electrode, and
   wherein the first offset distance extends between an edge of the overlapping region and the start of the curved portion of the rounded corner.

2. The electrode assembly of claim 1, wherein the overlapping region is generally rectangular.

3. The electrode assembly of claim 1, wherein at least one of the first electrode or second electrode is generally rectangular.

4. The electrode assembly of claim 1, wherein the first electrode has a width in the second direction that is less than the length of the first electrode in the first direction.

5. The electrode assembly of claim 1, wherein the second electrode has a width in the first direction that is less than the length of the second electrode in the second direction.

6. The electrode assembly of claim 1, wherein the overlap region has a length in the first direction equal to a width of the second electrode, and wherein the overlap region has a length in the second direction equal to a width of the first electrode.

7. The electrode assembly of claim 1, wherein the at least one rounded corner is elliptically shaped.

8. The electrode assembly of claim 1, wherein the generally planar shape of at least one of the first electrode or second electrode has a perimeter that is geometrically continuous to at least a first order.

9. The electrode assembly of claim 3, wherein the generally rectangular shape of the at least one of the first electrode or second electrode has four rounded corners.

10. The electrode assembly of claim 1, wherein an angle is formed between the first direction and the second direction that is greater than about 60 degrees and less than about 120 degrees.

11. The electrode assembly of claim 1, wherein:
   the first electrode has a pair of opposing first edges that generally extend in the first direction and a pair of second opposing edges that generally extend in the second direction;
   the second electrode has a pair of opposing first edges that generally extend in the first direction and a pair of opposing second edges that generally extend in the second direction; and
   the overlapping region has a parallelogram shape having a perimeter formed by the pair of opposing second edges of the second electrode located in between the pair of first edges of the first electrode.

12. The electrode assembly of claim 11, wherein at least one of the pair of opposing first edges of the first electrode is spaced apart from at least one of the pair of opposing second edges of the second electrode by the first offset distance.

13. The electrode assembly of claim 11, wherein at least one of the pair of opposing second edges of the first electrode is spaced apart from at least one of the pair of opposing first edges of the second electrode by the second offset distance.

14. The electrode assembly of claim 1, further comprising a dielectric material disposed between the first electrode and the second electrode, the dielectric material having a thickness ranging from about 10 microns to about 1000 microns.

15. An electrode assembly comprising:
a first electrode having a generally planar shape and a length in a first direction;
a second electrode having a generally planar shape and a length in a second direction, the second electrode overlapping the first electrode such that an overlapping region is formed, the overlapping region having an area that is insensitive to a relative misalignment in the first direction between the first electrode and the second electrode that is less than a first offset distance, and wherein the area of the overlapping region is insensitive to a relative misalignment in the second direction between the first electrode and the second electrode that is less than a second offset distance in the second direction, and wherein a ratio of the length of the first electrode to the first offset distance is less than about 3, and a ratio of the length of the second electrode to the second offset distance is less than about 3; and
an organic dielectric material disposed between the first electrode and the second electrode,
wherein the first electrode has a rounded corner, the rounded corner having a start where a curved portion of the rounded corner begins, the start located along the length of the first electrode, and
wherein the first offset distance extends between an edge of the overlapping region and the start of the curved portion of the rounded corner.

16. The electrode assembly of claim 15, wherein the organic dielectric comprises liquid crystalline polymer.

17. The electrode assembly of claim 15, wherein the organic dielectric comprises polyphenyl ether.

18. The electrode assembly of claim 15, wherein the organic dielectric material has a thickness ranging from about 10 microns to about 1000 microns.

* * * * *